United States Patent [19]

McDonnell

[11] Patent Number: 4,514,059
[45] Date of Patent: Apr. 30, 1985

[54] INCOHERENT OPTICAL HETERODYNE FOURIER TRANSFORMER

[75] Inventor: Michael M. McDonnell, Woodbridge, Va.

[73] Assignee: The United States of America as represented by the Secretary of the Army, Washington, D.C.

[21] Appl. No.: 418,318

[22] Filed: Sep. 15, 1982

[51] Int. Cl.³ .......................... G06G 9/00; G02B 5/18
[52] U.S. Cl. ........................... 350/162.16; 350/162.12; 364/822
[58] Field of Search ....................... 350/162.12, 162.16, 350/162.13, 162.14; 364/822

[56] References Cited

U.S. PATENT DOCUMENTS

| | | | |
|---|---|---|---|
| 3,540,791 | 11/1970 | Caulfield et al. | 350/3.5 |
| 3,669,528 | 6/1972 | Richardson | 350/162.16 |
| 3,700,907 | 10/1972 | Myer et al. | 350/162.16 |
| 4,037,918 | 7/1977 | Kato | 350/3.5 |
| 4,063,799 | 12/1977 | Bernstein et al. | 350/162 SF |
| 4,082,429 | 4/1978 | Ward et al. | 350/162 SF |
| 4,082,431 | 4/1978 | Ward | 350/162 SF |
| 4,118,107 | 10/1978 | Parrent, Jr. et al. | 350/162 SF |
| 4,130,348 | 12/1978 | Minami | 350/162 SF |
| 4,138,190 | 2/1979 | Bryngdahl | 350/3.70 |

Primary Examiner—John K. Corbin
Assistant Examiner—William Propp
Attorney, Agent, or Firm—Darrell E. Hollis

[57] ABSTRACT

An apparatus for performing an incoherent optical Fourier transform includes a source of incoherent light, means for generating and phase modulating a first zone plate, a second zone plate, means for detecting incoherent light processed by the apparatus, and means for filtering the output signal, thereby discriminating between the Fourier transform signal and background constant or bias signals. A method for performing incoherent optical Fourier transform is also disclosed.

13 Claims, 3 Drawing Figures

INCOHERENT OPTICAL HETERODYNE FOURIER TRANSFORMER

STATEMENT OF GOVERNMENT INTEREST

The invention described and claimed herein may be manufactured and used by or for the Government of the United States of America for governmental purposes without the payment of royalties thereon or therefor.

BACKGROUND OF THE INVENTION

1. Field of the Invention

The invention relates to incoherent optical processing, particularly to a method and apparatus for performing Fourier transforms of image data using incoherent light.

This invention has significance in the area of automated image analysis for derivation of intelligence information from aerial photography or other image inputs. The Fourier Transform has proven itself to be useful for this purpose and this invention offers a lower noise Fourier Transform than is possible with known analog methods.

2. Discussion of the Related Art

The only known useful method for performing rapid parallel Fourier transforms of image data employs a coherent optical system. In such a system, coherent light, such as from a laser, is passed through a photographic transparency and focused to a point by a lens. The distribution of light around this focused point is an analog representation of the Fourier transform of the information contained in the photographic transparency. However, coherent noise can swamp the low-level information signal. This reduces the ability of the system to perform the subtle discrimination function which is essential to performing image analysis.

Incoherent Fourier transforms are not as easily constructed as coherent transforms. A series of sine and cosine masks can be multiplied by the input transparency and the resulting throughput integrated to give one point of the transform. In this manner, the transform may be built up point by point. This technique, however, has no advantage over digital methods in general use which are equally slow but have much lower noise.

To assure adequate speed in forming a Fourier transform, parallel processing of input information is required. An incoherent optical processing method using Fresnel zone plates is described in the literature. A Fresnel zone plate, commonly called simply a "zone plate", is a photographic transparency having a circularly symmetrical arrangement of alternating transparent and opaque zones whose boundaries are at radii proportional to the square roots of whole numbers. An input transparency located between zone plates suitably scaled and spaced will produce a Fourier transform in parallel at a properly chosen output plane.

Incoherent optical processing has an inherently lower noise level than coherent optical processing systems because of the channel redundancy associated with incoherent processing. Additionally, despite a lower throughput than equivalent coherent systems, the information throughput of an incoherent system is much higher than that of a serial processor such as an analog or digital electronic computer. However, a serious difficulty in incoherent processing methods is the presence of a large constant or bias signal, hundreds of times larger than the varying output signal sought. While the incoherent method should theoretically have lower noise, and therefore allow finer discrimination of input differences than coherent methods, the large bias term has prevented testing of this theory, and optical processing is currently performed exclusively by coherent optical systems despite their noisy character.

OBJECTS OF THE INVENTION

It is therefore an object of this invention to overcome the difficulties associated with known incoherent optical processing methods.

It is an object of the invention to provide means and a method for cancelling out the bias associated with incoherent optical processing, thereby providing a useful high-speed and low-noise method of incoherent optical processing.

It is another object of this invention to provide an apparatus and a method for facilitating incoherent optical Fourier transformations.

It is a further object of the invention to provide a method and apparatus for isolating a Fourier transform signal from output of an incoherent optical processor.

A still further object is to provide means and method for modulating a Fourier transform signal in an incoherent optical processor.

Finally, an object of the invention is to provide a device and method for modulating the Fourier transform signal in an incoherent optical processor, while leaving the constant background signal unmodulated, whereby the Fourier transform signal can be separated from the background noise.

SUMMARY OF THE INVENTION

The invention comprises a method for performing a Fourier transform of a transparent image comprising providing first and second zone plates having alternating transparent and opaque zones. The image is positioned between the first and second zone plates and incoherent light is passed through the first zone plate, the image, and the second zone plate. The first zone plate is phase modulated at a known rate, and the output from the second zone plate is detected. A signal representative of the output is generated and filtered to isolate therefrom signals of a frequency equal to the known rate.

In another of its aspects, the invention comprises a method for performing a Fourier transform of an opaque image which comprises projecting a first zone plate having alternating light and dark zones onto the image. A second zone plate having alternating transparent and opaque zones is also provided. Incoherent light is reflected from the image and passed through the second zone plate. The first zone plate is phase modulated at a known rate and the output from the second zone plate is detected. A signal representative of the output is generated and filtered to isolate therefrom signals of a frequency equal to the known rate.

The method includes projecting the first zone plate from an interferometer onto a translucent screen or onto an opaque image.

The first zone plate may be modulated by varying the frequency of light emitted from the interferometer. Alternatively, the interferometer may include means for defining separate paths for light emitted therefrom; the first zone plate is modulated by varying the length of one of the paths. The alternating zones of the first zone plate are concentrically arranged at respective radial distances from the center of the plate. Phase modulation is obtained by varying the radial distances of the respective alternating zones from the center of the first zone plate.

In another of its aspects, the invention comprises apparatus for performing an incoherent optical Fourier transform of an image. The apparatus comprises a source of incoherent light, means for generating and for phase modulating a first zone plate, and a second zone plate spaced from the first zone plate. Means are provided spaced from the second zone plate for detecting incoherent light and for generating a signal. Means for filtering the signal generated by the detecting means are also included. The generating and phase modulating means modulates the first zone plate at a known rate, and the filtering means isolates signals of a frequency equal to that rate.

The generating and modulating means comprises an interferometer including means for defining separate light paths therethrough and means for varying the length of one of the paths. Alternatively, the generating and modulating means may include an interferometer and means for varying the frequency of light emitted thereby. The first and second zone plates comprise alternating concentric transparent and opaque zones spaced at respective radial distances from the center of each plate. Phase modulation of the first zone plate is accomplished by varying the radial distances of the alternating zones from the center of the first plate.

BRIEF DESCRIPTION OF THE DRAWINGS

The above objects and features will be best understood in light of the detailed description hereinbelow, considered together with the accompanying drawings, in which.

DETAILED DESCRIPTION OF THE PREFERRED EMBODIMENTS

Figure 1:
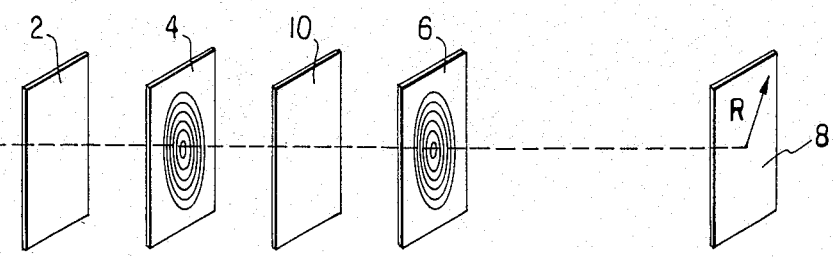
FIG. 1 illustrates an optical processing system known in the prior art.

Two things may be optically multiplied by making transparencies of them and laying the transparencies over one another. If two zone plates are multiplied in this manner, a series of sinusoidal fringes crossing the zone plates will result. The fringes will have a frequency proportional to the distance of separation (nonalignment) of the plate centers and will cross the zone plates in a direction perpendicular to the line of separation between the centers.

Instead of moving one zone plate across another to separate their centers, a similar result is obtained by separating the two zone plates by some distance. When viewed from different points within an output plane spaced from and parallel to the zone plates, parallax results in an apparent separation between the centers of the plates. The result will be linear sinusoidal fringes, as discussed above.

It has been known to take a Fourier transform of a transparency by placing it between these two zone plates. At various points in the output plane, the transparency is optically multiplied by the linear fringes. It is also multiplied by the zone plates. However, if the spatial frequency of the fringes is kept sufficiently low, the frequencies of the zone plates will not interfere with the results.

When the transparency is multiplied by a single spatial frequency, a single point in the Fourier transform is generated. If the frequency is changed, another point in the transform will be obtained, and so on. In this manner, a Fourier transform is obtained by changing both the spatial frequency and the orientation of the linear fringes.

A drawback of this known system is that a large bias term tends to overpower the small, varying output desired. It has been known that it would be advantageous to use modulation to separate the desired signals from background noise, modulating the signals without modulating the background. However, a method for doing so has not yet been developed. The present invention provides a method for modulating the Fourier transform signal while leaving the constant background unmodulated. The desired signal can then be easily separated from the undesired background bias component by simple electrical filtering techniques.

Instead of using two transparencies as zone plates, the present invention achieves the desired modulation by generating one of the zone plates in an interferometer. The interferometer provides two sources of light separated longitudinally from one another, producing a circular system of alternate light and dark zones. The output of the interferometer is projected onto a ground glass screen, generating a zone plate as described above. By varying the longitudinal separation of the two light sources in the interferometer, the positions of the transparent and opaque zones are varied.

As the circular zones are moved in and out on the ground glass screen, the linear system of fringes, which is formed by multiplication of this zone plate with another zone plate, also varies. The Fourier transform signal thus generated will likewise vary. If the output of the interferometer is varied at a known frequency, the desired signal at the output plane will vary at the same frequency. One may then use a very narrow band electrical filter associated with an output detector to discriminate the desired signal from the constant background, as well as from any frequencies which may be present due to, for example, variations of laser strength or vibration.

The present invention will be best understood in conjunction with a description of a known zone plate incoherent optical processor. Referring to FIG. 1, a known optical processing apparatus includes an evenly illuminated incoherent white light source 2. A first zone plate 4 and a second zone plate 6 are appropriately spaced from each other. The zone plates have concentric alternating transparent and opaque zones. When viewed from the output plane 8, zone plates 4 and 6 create linear sinusoidal transmittance by the Moire effect. The frequency of these Moire fringes increases as the zone plates are viewed from increasing off-axis distances R in output plane 8, as illustrated in FIG. 1. The direction of these fringes is always perpendicular to the direction of R.

An input transparency 10 is positioned between zone plates 4 and 6. Multiplication of transparency 10 generates a sine or cosine transform in output plane 8, depending upon the relative phase relationships of the respective zone plates. Propagation of incoherent light from source 2 through the illustrated system performs this multiplication and, in the geometrical optics approximation where there is no diffraction, a Fourier transform of input transparency 10 is produced at output plane 8. This processing is performed in parallel without any moving parts.

Figure 2:
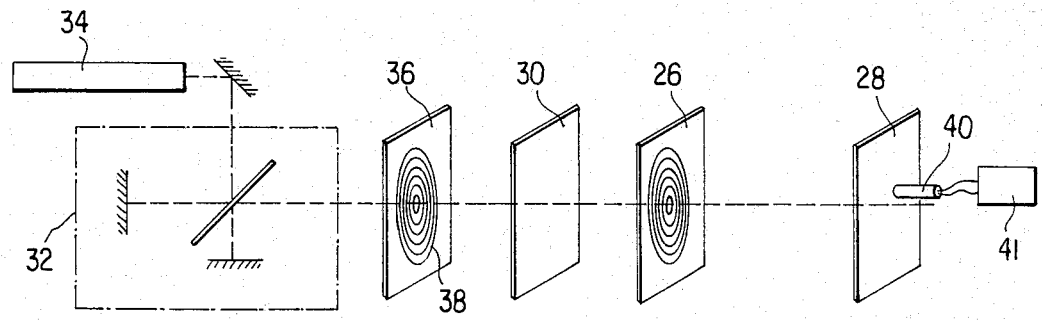
FIG. 2 illustrates a first embodiment of an apparatus in accordance with the present invention.

The present invention is based upon the two-zone plate Fourier transformer described with reference to FIG. 1. A novel feature is that one of the zone plates is generated in an interferometer. This zone plate is modulated, which in turn modulates the output signal without modulating the undesired bias. A first embodiment of the present invention, illustrated in FIG. 2, includes second zone plate 26, output plane 28, and input transparency 30 corresponding generally to elements 6, 8 and 10 of FIG. 1. In place of incoherent light source 2, the invention includes an interferometer 32 illuminated with diverging light from a laser 34. Interferometer 32 is conventional, for example a Michelson type having means for defining two distinct light paths. Interferometer 32 may be designed so that there is a difference in the respective path lengths whereby the light in the respective paths will be out of phase. The output from the interferometer is projected onto a ground glass screen 36. The result is an image 38 comprising alternate dark and light circular zones. This image is essentially an illuminated zone plate, and takes the place of light source 2 and first zone plate 4 in FIG. 1.

By varying either the frequency of the light emitted from interferometer 32 or the path length in one arm of the interferometer in a regular manner, the positions of the circular zones on screen 36 will be varied. The zones may be moved radially inwardly or outwardly, thus phase modulating image 38 on screen 36.

As the concentric zones of image 38 move in and out, the linear system of fringes formed by multiplication of this image and second zone plate 26 also moves. The vectors forming the sine and cosine components of the Fourier transform signal in output plane 28 will vary accordingly with time. A suitably positioned detector 40 detects the incoherent light at output plane 28 and generates an electrical signal in response to the detected light. The frequency of variation of the Fourier transform signal at output plane 28 will equal the frequency at which image 38 is phase modulated. Therefore, knowing the frequency of phase modulation of the image, a very narrow band electrical filter 41 may be employed to discriminate the desired signal from background noise and bias, as well as from any frequencies which might be present in the system because of, for example, variations in laser strength or vibration.

A large dynamic range is required for output detector 40, which may comprise a photomultiplier tube, an image dissector tube, or possibly an orthicon. Interferometer 32 may be modulated by several well known means, such as a Mackowski rotating polarizer stack, an electro-optic crystal, a piezoelectric or other mechanical mover on one of the mirrors of the interferometer, or a tilted glass plate in one of the arms of the interferometer. A piezoelectric mover on one of the mirrors has performed satisfactorily in laboratory tests of the apparatus.

In operation, interferometer 32 is tuned to produce an image or illuminated zone plate 38 of proper size to produce linear Moire fringes as seen from output plane 28. Transparency 30 is placed midway between ground glass screen 36 and second zone plate 26. Even though a laser is used as the light source for this apparatus, it is still operating incoherently since the laser light is expanded to a large effective source, destroying its spatial coherence. Since it is detected over a period of several cycles of phase modulation, its temporal coherence is also destroyed.

Interferometer 32 phase modulates illuminated zone plate 38 in the manner described hereinabove. The incoherent light passing through screen 36, transparency 30, and zone plate 26 is detected at output plane 28 by detector 40, which converts the optical signal to an electrical signal. Filter 41 distinguishes the modulated Fourier transform signal from the large bias signal, in the manner previously described.

Figure 3:
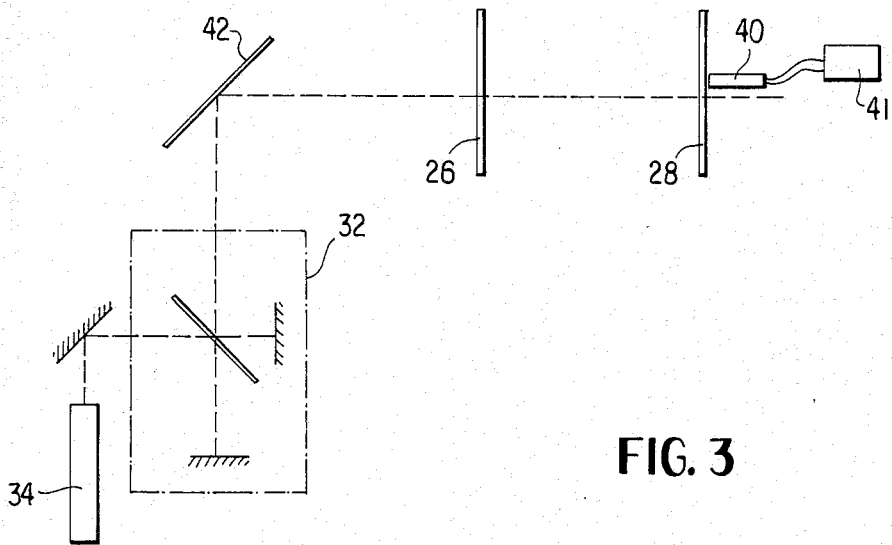
FIG. 3 illustrates a second embodiment of an apparatus in accordance with the invention.

FIG. 3 illustrates a second embodiment of the present invention, suitable for performing a Fourier transform of an opaque input image. In the embodiment of FIG. 3, laser 34 and interferometer 32 project and phase modulate zone plate or image 38 directly onto the face of opaque image 42, which may comprise, for example, a photograph. Thus, opaque input 42 takes the place of both screen 36 and transparency 30 of the FIG. 2 embodiment. Incoherent light from laser 34 is reflected from input 42 through zone plate 26, to be detected at output plane 28. The operation of this embodiment is otherwise similar to that of the FIG. 2 apparatus.

The apparatus and method of the present invention enables a higher signal-to-noise ratio to be obtained with a heterodyne device than was heretofore possible. The speed of operation of the apparatus is limited only by the detector and filtering means since the Fourier transform itself is performed in parallel at the speed of light. The invention thus provides apparatus and a technique for rapidly and effectively performing a Fourier transform of an input image using an incoherent light source.

While the invention has been described with reference to the accompanying drawings, it should not be considered as limited to the details shown therein as obvious modifications may be made to both the apparatus and method of the present invention by those of ordinary skill in the art, the invention being limited only by the claims appended hereto.

I claim:

1. A method for performing a Fourier transform of a transparent image, comprising:
   providing a first zone plate comprising alternating transparent and opaque zones;
   providing a second zone plate comprising alternating transparent and opaque zones;
   positioning the image between said first and second zone plates;
   passing incoherent light through said first zone plate, the image, and said second zone plate;
   phase modulating said first zone plate at a known rate;
   detecting the output from said second zone plate and generating a signal representative of the output; and
   filtering said signal to isolate therefrom signals of a frequency equal to said known rate.

2. A method for performing a Fourier transform of an opaque image, comprising:
   projecting a first zone plate comprising alternating light and dark zones onto the image;
   providing a second zone plate comprising alternating transparent and opaque zones;
   reflecting incoherent light from the image and passing the reflected light through said second zone plate;
   phase modulating said first zone plate at a known rate;

detecting the output from said second zone plate and generating a signal representative of the output; and filtering said signal to isolate therefrom signals of a frequency equal to said known rate.

3. A method as set forth in claim 1 or 2, comprising projecting said first zone plate from an interferometer.

4. A method as set forth in claim 1, comprising projecting said first zone plate from an interferometer onto a transparent screen.

5. A method as set forth in claim 1 or 2, wherein:
said first zone plate is projected from an interferometer; and
said first zone plate is modulated by varying the frequency of light emitted from said interferometer.

6. A method as set forth in claim 1 or 2, wherein:
said first zone plate is projected from an interferometer, said interferometer comprising means defining separate paths for light emitted therefrom; and
said first zone plate is modulated by varying the length of one of said paths.

7. A method as set forth in claim 1 or 2 wherein:
said alternating zones of said first zone plate are concentrically arranged at respective radial distances from the center of said first zone plate; and
said phase modulation comprises varying the radial distances of the respective alternating zones from the center of the first zone plate.

8. Apparatus for performing an incoherent optical Fourier transform of an image, comprising:

a source of incoherent light;
means for generating and for phase modulating a first zone plate;
a second zone plate spaced from said first zone plate;
means for detecting incoherent light and generating a signal spaced from said second zone plate; and
means for filtering the signal generated by said detecting means.

9. Apparatus as set forth in claim 8, wherein said generating and phase modulating means modulates said first zone plate at a known rate, and said filtering means isolates signals of a frequency equal to said rate.

10. Apparatus as set forth in claim 8, wherein said generating and modulating means comprises an interferometer including means for defining separate light paths through said interferometer, and means for varying the length of one of said paths.

11. Apparatus as set forth in claim 8, wherein said generating and modulating means comprises an interferometer including means for varying the frequency of light emitted by said source.

12. Apparatus as set forth in claim 8, wherein each of said first and second zone plates comprises alternating concentric transparent and opaque zones spaced at respective radial distances from the center of each zone plate.

13. Apparatus as set forth in claim 12, wherein said means for phase modulating said first zone plate comprises means for varying the radial distances of said alternating zones from the center of said first zone plate.

* * * * *